(12) United States Patent
Huang et al.

(10) Patent No.: US 9,385,569 B2
(45) Date of Patent: Jul. 5, 2016

(54) PLASTIC-PACKAGE MOTOR

(71) Applicant: Zhongshan Broad-Ocean Motor Manufacturing Co., Ltd., Zhongshan (CN)

(72) Inventors: Tingshuai Huang, Zhongshan (CN); Jianwei Jin, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 216 days.

(21) Appl. No.: 13/844,986

(22) Filed: Mar. 17, 2013

(65) Prior Publication Data
US 2014/0183983 A1    Jul. 3, 2014

(30) Foreign Application Priority Data

Dec. 28, 2012  (CN) ...................... 2012 2 0741197 U

(51) Int. Cl.
| | | |
|---|---|---|
| *H02K 3/28* | (2006.01) | |
| *H02K 5/08* | (2006.01) | |
| *H02K 5/15* | (2006.01) | |
| *H02K 15/14* | (2006.01) | |
| *H02K 15/12* | (2006.01) | |

(52) U.S. Cl.
CPC .. *H02K 3/28* (2013.01); *H02K 5/08* (2013.01); *H02K 5/15* (2013.01); *H02K 11/40* (2016.01); *H02K 15/14* (2013.01); *H02K 15/12* (2013.01)

(58) Field of Classification Search
CPC ..... H02K 3/28; H02K 11/0089; H02K 15/12; H02K 15/14; H02K 5/08; H02K 5/15; H02K 11/40
USPC .................... 310/43, 68 R, 71, 90, 112, 68 B; 417/423.7; 477/12
See application file for complete search history.

(56) References Cited

U.S. PATENT DOCUMENTS

| | | | | | |
|---|---|---|---|---|---|
| 4,216,512 | A | * | 8/1980 | Vidwans ................ | G11B 19/20 360/133 |
| 4,387,793 | A | * | 6/1983 | Sugano ........................... | 477/12 |
| 4,616,149 | A | * | 10/1986 | Best ........................ | H02K 3/50 310/67 R |
| 6,008,980 | A | * | 12/1999 | Stevenson ................ | H01G 4/35 361/302 |

(Continued)

FOREIGN PATENT DOCUMENTS

| | | | |
|---|---|---|---|
| CN | 202334156 U | * | 7/2012 |
| CN | 202488283 U | * | 10/2012 |

OTHER PUBLICATIONS

CN202488283U—Translation.*

*Primary Examiner* — Alex W Mok
(74) *Attorney, Agent, or Firm* — Matthias Scholl P.C.; Matthias Scholl

(57) ABSTRACT

A plastic-package motor, including: a rotating shaft, a rotor assembly, a plastic-package stator, a front end cover, a rear end cover, an injection-molding end plate, and a conducting strip. The rotating shaft and the rotor assembly are installed and connected together. The plastic-package stator is sleeved outside the rotor assembly. The front end cover is injection-molded on the injection-molding end plate at the bottom of the plastic-package stator. The injection-molding end plate is covered outside the front end cover. The rear end cover is installed at the other end of the plastic-package stator, and two ends of the rotating shaft are supported on a bearing of the front end cover and a bearing of the rear end cover, respectively. One end of the conducting strip is electrically connected with the front end cover.

7 Claims, 7 Drawing Sheets

(56) References Cited

U.S. PATENT DOCUMENTS

| | | | | |
|---|---|---|---|---|
| 6,392,322 B1 * | 5/2002 | Mares | | B23Q 5/58 |
| | | | | 310/12.04 |
| 6,469,414 B2 * | 10/2002 | Rehder | | H01F 38/18 |
| | | | | 310/129 |
| 6,483,213 B1 * | 11/2002 | Hsu | | 310/68 R |
| 6,858,955 B2 * | 2/2005 | Lau | | H01R 39/24 |
| | | | | 310/239 |
| 8,664,825 B2 * | 3/2014 | Ono et al. | | 310/196 |
| 2011/0057524 A1 * | 3/2011 | Andrieux et al. | | 310/71 |
| 2011/0068646 A1 * | 3/2011 | Terakubo et al. | | 310/71 |
| 2012/0112588 A1 * | 5/2012 | Watanabe | | H02K 1/276 |
| | | | | 310/90 |
| 2012/0187784 A1 * | 7/2012 | Hamer | | H01M 2/1022 |
| | | | | 310/71 |
| 2012/0248911 A1 * | 10/2012 | Ono et al. | | 310/90 |
| 2012/0286608 A1 * | 11/2012 | Komiyama | | H02K 1/30 |
| | | | | 310/90 |

* cited by examiner

PLASTIC-PACKAGE MOTOR

CROSS-REFERENCE TO RELATED APPLICATIONS

Pursuant to 35 U.S.C. §119 and the Paris Convention Treaty, this application claims the benefit of Chinese Patent Application No. 201220741197.0 filed Dec. 28, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a plastic-package motor.

2. Description of the Related Art

In the plastic-package DC brushless motor, as the plastic packaging material of the motor body part is insulated, actually, the front end cover cannot be directly conducted with the rear end cover, and the motor structure cannot prevent the electrical erosion of a bearing. Thus, the lubricating oil for the bearing causes insulation destruction to generate shaft current, wavy wear is found in the inner ring and the outer ring of the bearing, and abnormal sound occurs. Therefore, so as to solve the problems, a conductive adhesive tape is usually stuck on the outer surface of the motor or an electric conductor is connected, however, the plastic-package motor is easy to fall off during the transportation, and has poor reliability.

SUMMARY OF THE INVENTION

In view of the above-described problems, it is one objective of the invention to provide a plastic-package motor. The plastic-package motor has a simple structure, solves the problem of electrical erosion of a bearing, and is firm in connection and good in reliability.

To achieve the above objective, in accordance with one embodiment of the invention, there is provided a plastic-package motor, comprising: a rotating shaft, a rotor assembly, a plastic-package stator, a front end cover, a rear end cover, an injection-molding end plate, and a conducting strip. The rotating shaft and the rotor assembly are installed and connected together. The plastic-package stator is sleeved outside the rotor assembly. The front end cover is injection-molded on the injection-molding end plate at a bottom of the plastic-package stator. The injection-molding end plate is covered outside the front end cover. The rear end cover is installed at the other end of the plastic-package stator, and two ends of the rotating shaft are supported on a bearing of the front end cover and a bearing of the rear end cover respectively. One end of the conducting strip is electrically connected with the front end cover, and the other end of the conducting strip is supported on an end surface of the plastic-package stator and is pressed by and electrically connected with the rear end cover.

In a class of this embodiment, a groove is formed outside the front end cover and on an end surface of the injection-molding end plate. The conducting strip is embedded in the groove and electrically connected with the front end cover, and a pressing block is embedded in the groove and presses on the conducting strip.

In a class of this embodiment, a notch is formed at the end surface of the other end of the plastic-package stator, and the conducting strip is embedded in the notch.

In a class of this embodiment, a strip-shaped groove is formed on a wall surface on an outer side of the plastic-package stator, extends onto an end surface of the front end cover and is communicated with the groove, and the conducting strip is embedded in the strip-shaped groove.

In a class of this embodiment, the pressing block is a rivet or a screw.

In a class of this embodiment, a circuit board is supported and installed on a step in the plastic-package stator.

In a class of this embodiment, both the front end cover and the rear end cover are made of conductive metal material.

In a class of this embodiment, the conducting strip is made of conductive material.

In a class of this embodiment, the conducting strip is a copper sheet or conductive lead wire.

Advantages of the invention are summarized below:

(1) the conducting strip is additionally arranged, one end of the conducting strip is electrically connected with the front end cover, and the other end of the conducting strip is supported on the end surface of the plastic-package stator and is electrically connected with the rear end cover through being pressed by the rear end cover, thus the plastic-package motor has a simple structure, solves the problem of electrical erosion of a bearing, and is firm in connection and good in reliability;

(2) the groove is formed outside the front end cover and on the end surface of the injection-molding end plate, the conducting strip is embedded in the groove and electrically connected with the front end cover, the pressing block is embedded in the groove and pressed on the conducting strip and adopts a rivet or screw, thus the structural design is reasonable, the installation is easy, and due to the use of a riveting tool, the assembly is simpler, and the process is better;

(3) the notch is formed at the end part of the other end of the plastic-package stator, the conducting strip is embedded in the notch and positioned through the notch, installation can be carried out in one step, thus the extra production process is avoided, the efficiency is improved, and the labor cost is saved;

(4) the strip-shaped groove is formed on the wall surface on the outer side of the plastic-package stator, extends onto the end surface of the front end cover and is communicated with the groove, the conducting strip is embedded in the strip-shaped groove, and the strip-shaped groove is directly reserved on the plastic-package stator mold, thus not only the dimensional accuracy is good, but also the front end cover is not required to be positioned during the production of the plastic-package stator, and the production assembly is simple.

DETAILED DESCRIPTION OF THE EMBODIMENTS

Example 1

Figure 1:
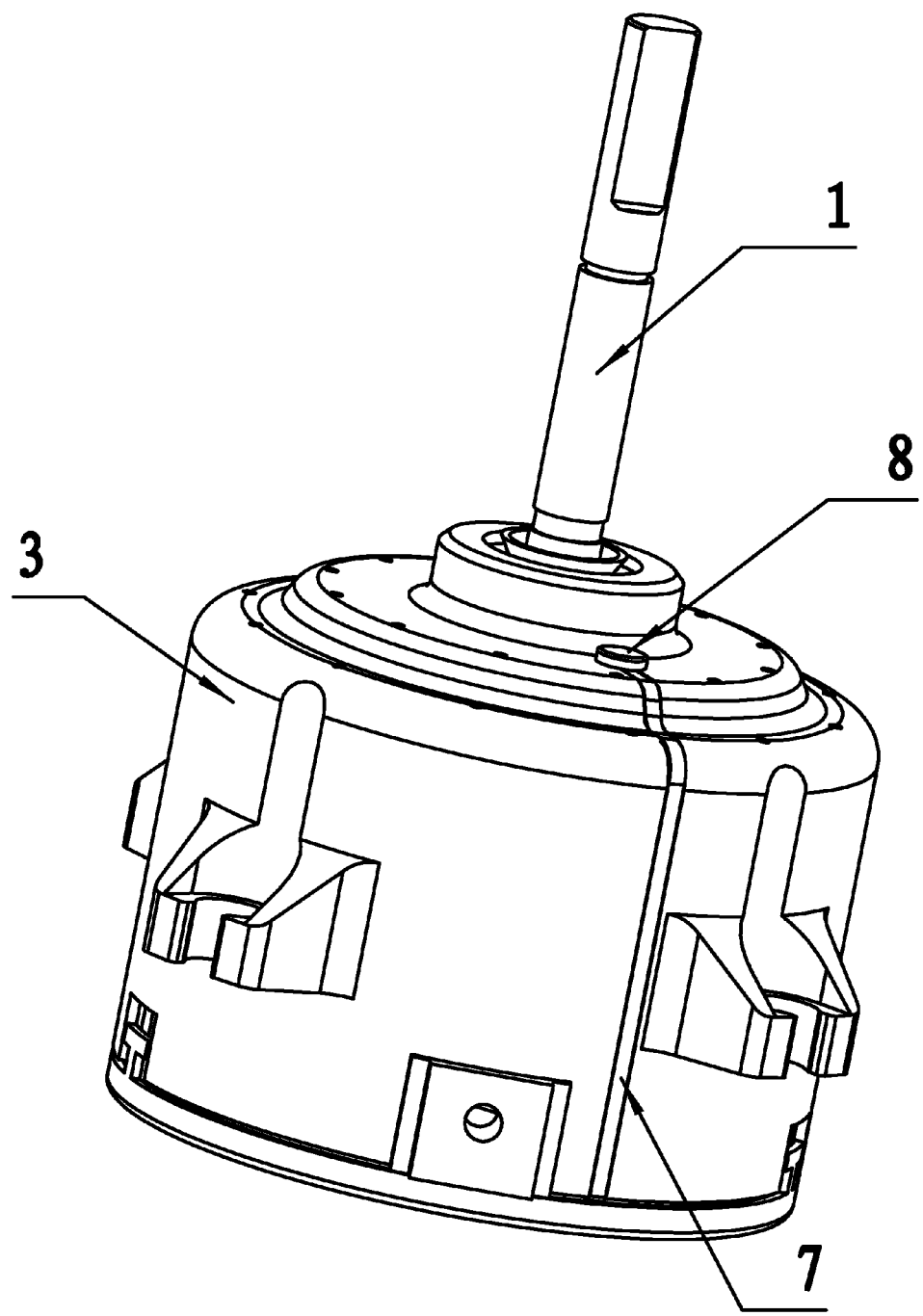
FIG. 1 is a stereograph of a plastic-package motor of the invention.
Figure 2:
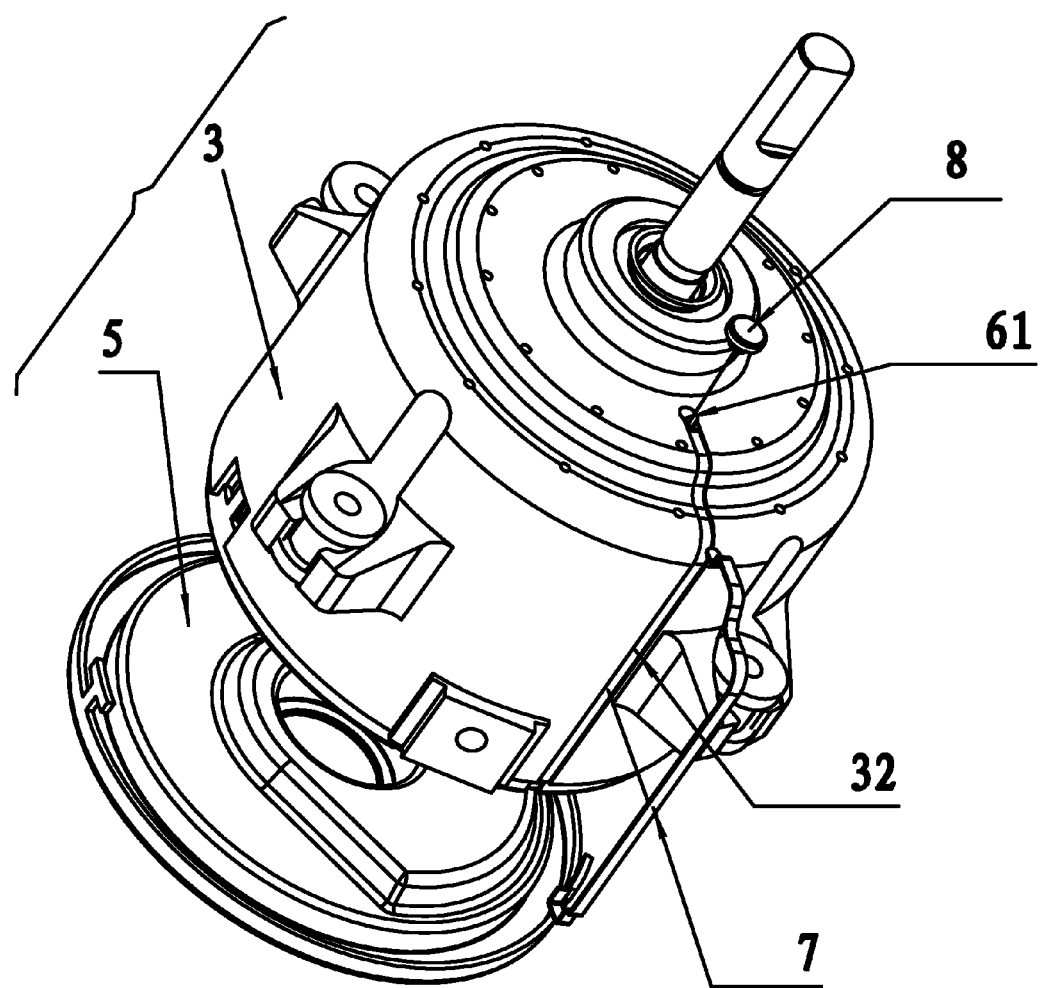
FIG. 2 is an exploded view of a plastic-package motor of the invention.
Figure 3:
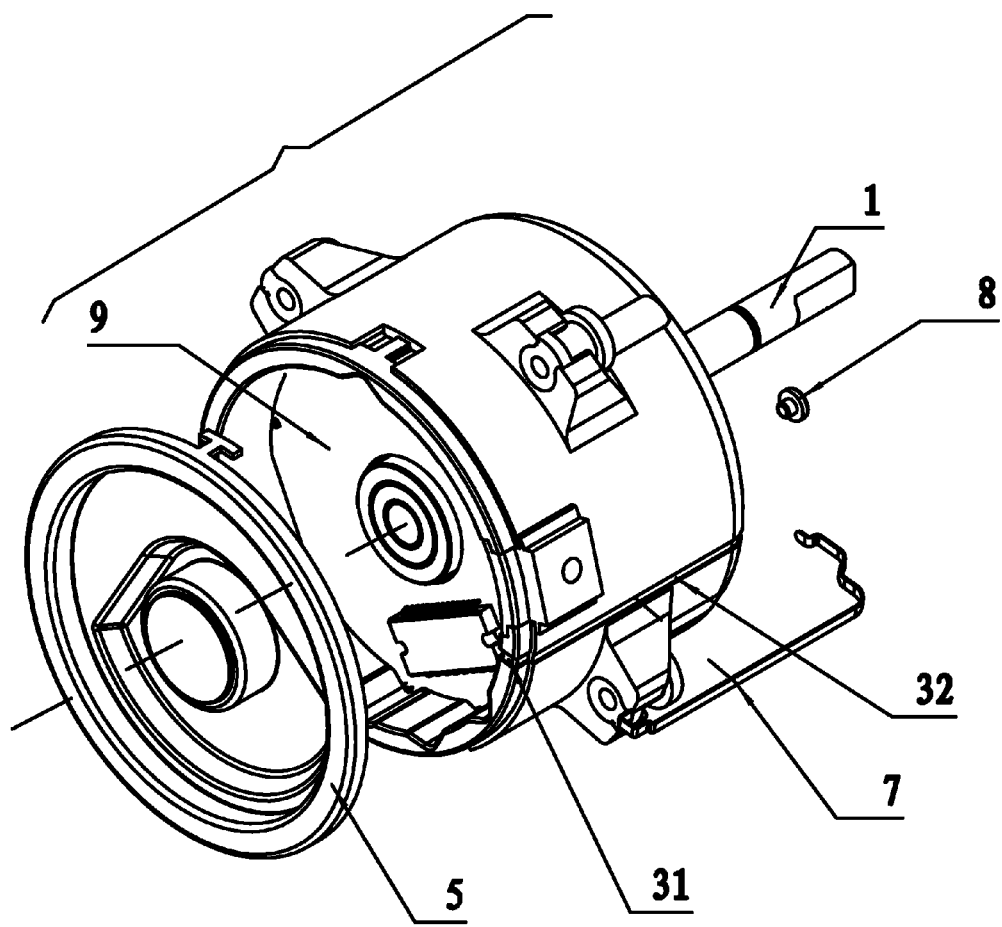
FIG. 3 is another exploded view of a plastic-package motor of the invention.
Figure 4:
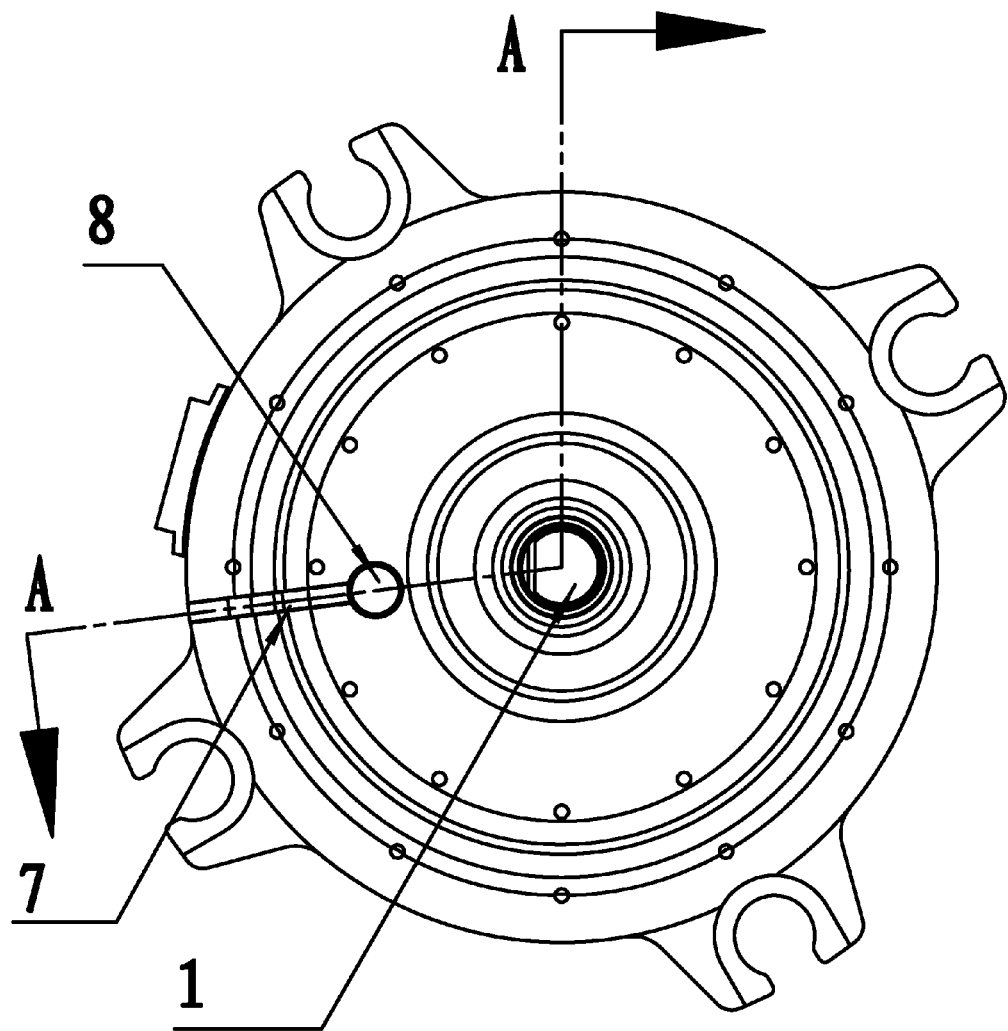
FIG. 4 is a schematic diagram of a plastic-package motor of the invention.
Figure 5:
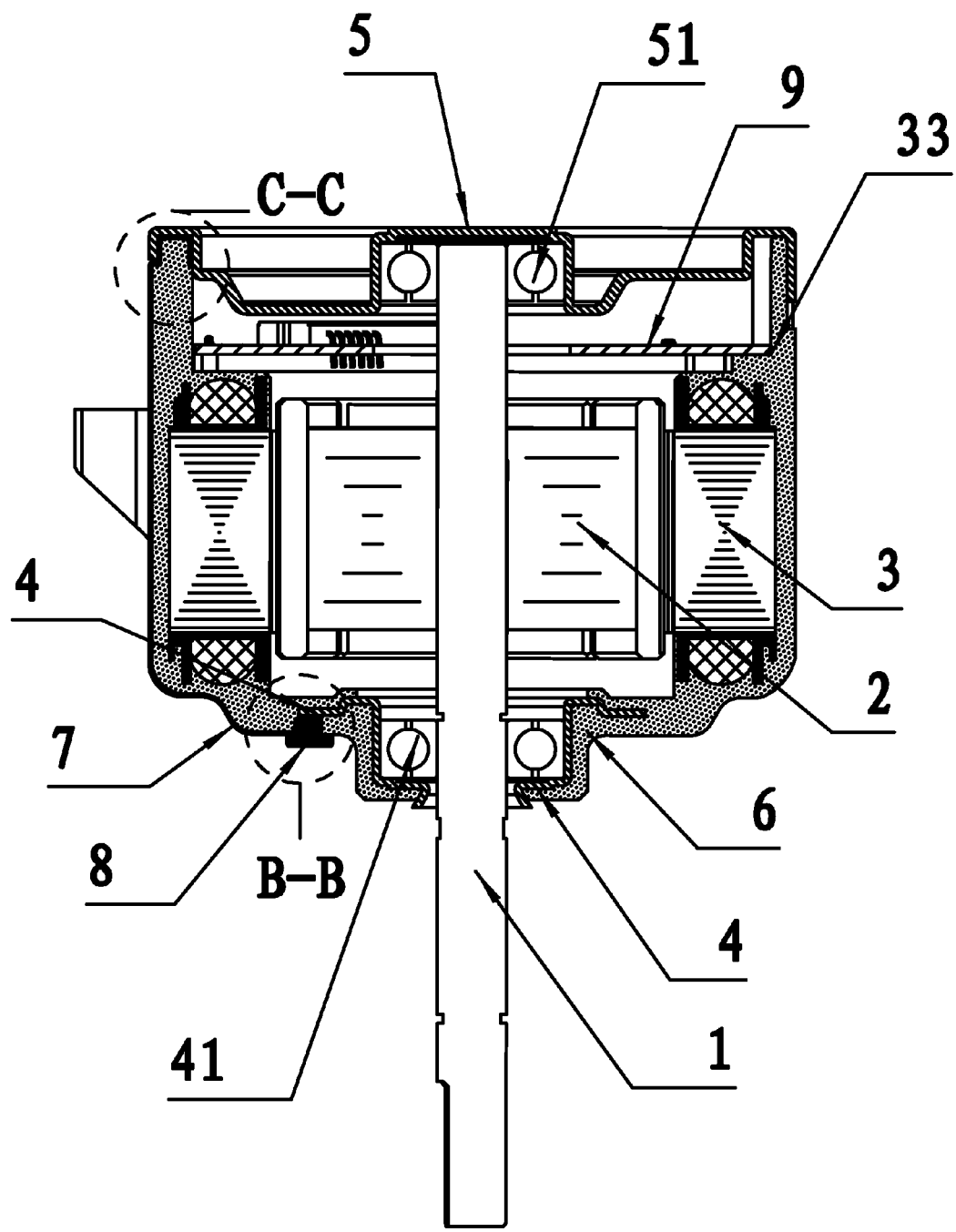
FIG. 5 is an exploded view of FIG. 4 taken from line A-A.
Figure 6:
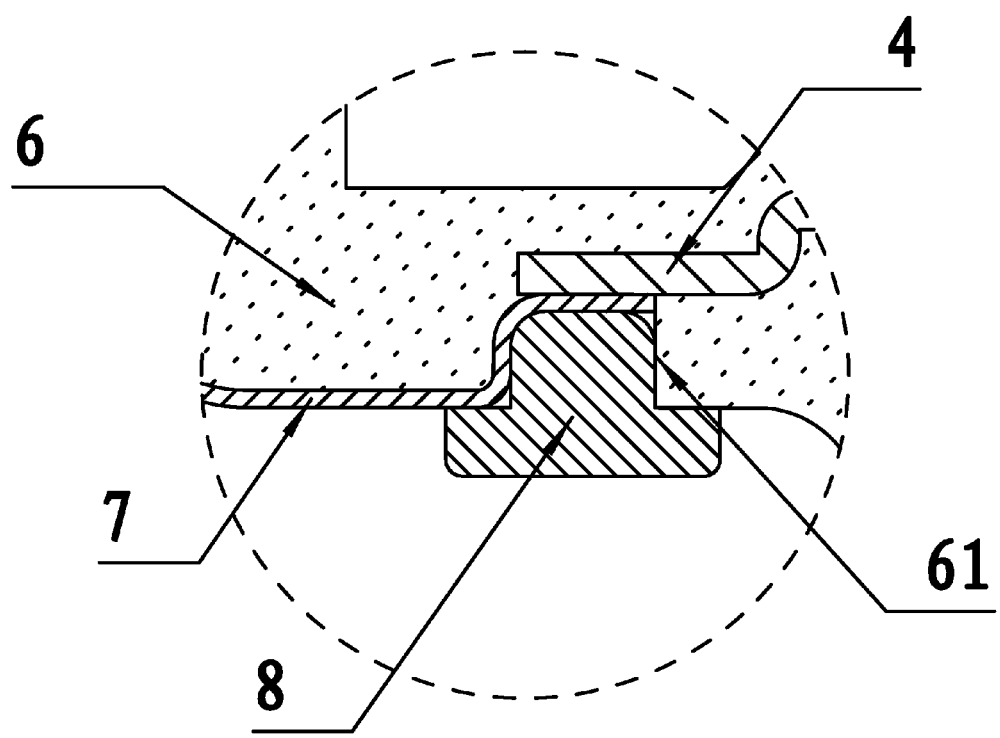
FIG. 6 is an enlarged view of part B-B of FIG. 5.
Figure 7:
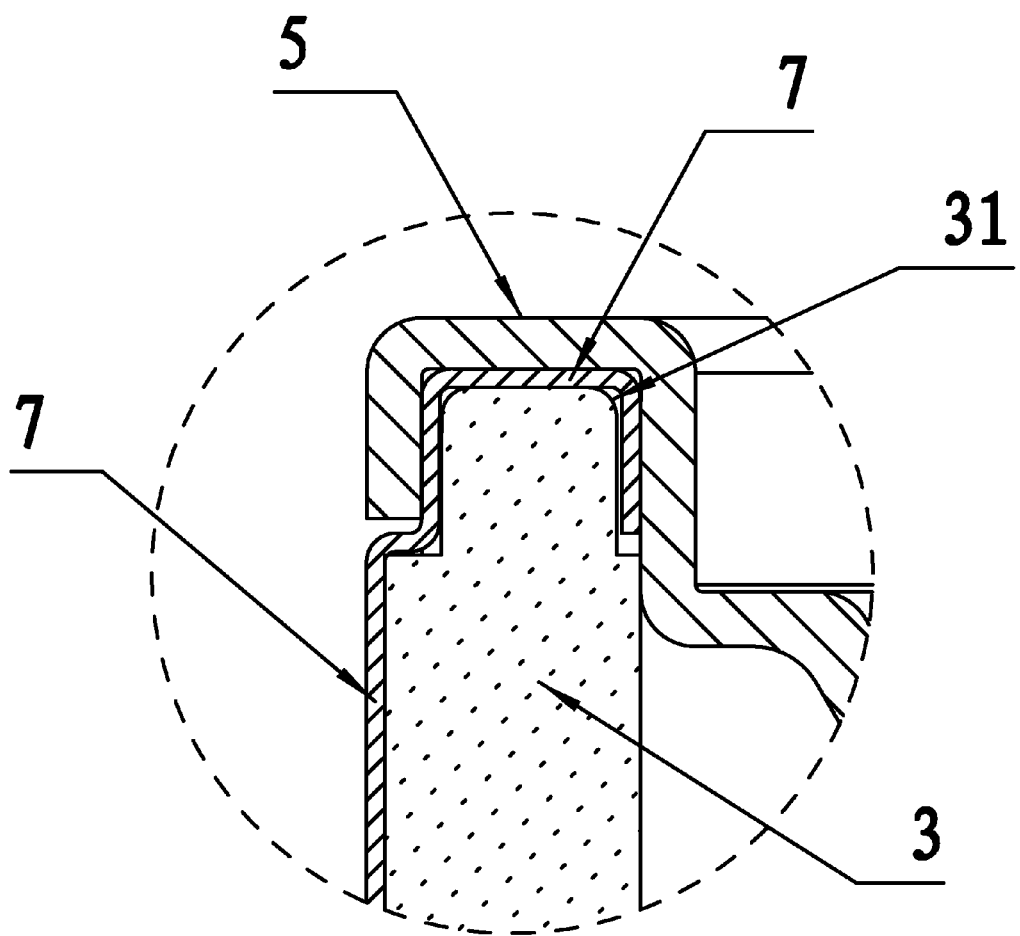
FIG. 7 is an enlarged view of part C-C of FIG. 5.

As shown in FIG. 1 to FIG. 7, a plastic-package motor comprises a rotating shaft 1, a rotor assembly 2, a plastic-package stator 3, a front end cover 4 and a rear end cover 5. The rotating shaft 1 and the rotor assembly 2 are installed and connected together. The plastic-package stator 3 is sleeved outside the rotor assembly 2. The front end cover 4 is injection-molded on an injection-molding end plate 6 at the bottom of the plastic-package stator 3. The injection-molding end plate 6 is covered outside the front end cover 4. The rear end cover 5 is installed at the other end of the plastic-package stator 3, and two ends of the rotating shaft 1 are supported on a bearing 41 of the front end cover 4 and a bearing 51 of the rear end cover 5 respectively. The plastic-package motor further comprises a conducting strip 7. One end of the conducting strip 7 is electrically connected with the front end cover 4, and the other end of the conducting strip 7 is supported on the end surface of the plastic-package stator 3 and is electrically connected with the rear end cover 5 through being pressed by the rear end cover 5.

Example 2

On the basis of Example 1, the technical characteristics are added as follows: a groove 61 is formed outside the front end cover 4 and on the end surface of the injection-molding end plate 6, the conducting strip 7 is embedded in the groove 61 and electrically connected with the front end cover 4, and a pressing block 8 is embedded in the groove 61 and pressed on the conducting strip 7.

Example 3

On the basis of Example 1 or 2, the technical characteristics are added as follows: a notch 31 is formed at the end part of the other end of the plastic-package stator 3, and the conducting strip 7 is embedded in the notch 31.

Example 4

On the basis of Example 2, the technical characteristics are added as follows: a strip-shaped groove 32 is formed on the wall surface on the outer side of the plastic-package stator 3, extends onto the end surface of the front end cover 4 and is communicated with the groove 61, and the conducting strip 7 is embedded in the strip-shaped groove 32.

Example 5

On the basis of Example 2, the technical characteristics are added as follows: the pressing block 8 is a rivet or a screw.

Example 6

On the basis of Example 1, the technical characteristic is added as follows: a circuit board 9 is supported and installed on a step 33 in the plastic-package stator 3.

Example 7

On the basis of Example 1, the technical characteristic is added as follows: both the front end cover 4 and the rear end cover 5 are made of conductive metal material.

Example 8

On the basis of Example 1, the technical characteristic is added as follows: the conducting strip 7 is made of conductive material.

Example 9

On the basis of Example 8, the technical characteristic is added as follows: the conducting strip 7 is a copper sheet or conductive lead wire.

The conducting strip 7 is additionally arranged, one end of the conducting strip 7 is electrically connected with the front end cover 4, and the other end of the conducting strip 7 is supported on the end surface of the plastic-package stator 3 and is electrically connected with the rear end cover 5 through being pressed by the rear end cover 5. Therefore, the plastic-package motor has a simple structure, solves the problem of electrical erosion of a bearing, and is firm in connection and good in reliability.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A plastic-package motor, comprising:
a) a rotating shaft;
b) a rotor assembly;
c) a plastic-package stator comprising a first end and a second end;
d) a front end cover;
e) a rear end cover comprising a first end and a second end;
f) an injection-molding end plate;
g) a conducting strip comprising a first end and a second end, the first end comprising a top surface and a bottom surface; and
h) a T-shaped pressing block comprising a first part and a second part; wherein:
the rotating shaft and the rotor assembly are installed and connected together;
the plastic-package stator is sleeved outside the rotor assembly;
the front end cover is injection-molded on the injection-molding end plate at the first end of the plastic-package stator;
the second end of the plastic-package stator comprises a first side surface, a second side surface, and an end surface;
the first side surface and the second side surface are substantially parallel to the rotating shaft;
the end surface is disposed between the first side surface and the second side surface and is substantially perpendicular to the rotating shaft;
a notch extends across the first side surface, the second side surface, and the end surface;
the injection-molding end plate is covered outside the front end cover;
the first end of the rear end cover is installed at the second end of the plastic-package stator, and two ends of the rotating shaft are respectively supported on a bearing of the front end cover and a bearing of the rear end cover;
a groove is formed outside the front end cover and on an end surface of the injection-molding end plate;

the first end of the conducting strip is embedded in the groove and the top surface of the first end of the conducting strip is in contact with and electrically connected to the front end cover;

the first part of the T-shaped pressing block is embedded in the groove and is in contact with the bottom surface of the first end of the conducting strip, wherein the T-shaped pressing block presses the first end of the conducting strip against the front end cover;

the second part of the T-shaped pressing block is disposed outside of the groove and is in contact with the injection-molding end plate;

the second end of the conducting strip is disposed in the notch;

the second end of the conducting strip comprises a first part, a second part, and a third part;

the first part, the second part, and the third part respectively corresponds to and contacts with the first side surface, the end surface, and the second side surface;

the second end of the rear end cover is disposed on and is electronically connected to the second end of the conducting strip;

the second end of the rear end cover comprises a fourth part, a fifth part, and a sixth part; and the fourth part, the fifth part, and the sixth part respectively corresponds to and contacts with the first part, the second part, and the third part.

2. The motor of claim 1, wherein a strip-shaped groove is formed on a wall surface on an outer side of the plastic-package stator, extends onto an end surface of the front end cover and is communicated with the groove, and the conducting strip is embedded in the strip-shaped groove.

3. The motor of claim 1, wherein the pressing block is a rivet or a screw.

4. The motor of claim 1, wherein a circuit board is supported and installed on a step in the plastic-package stator.

5. The motor of claim 1, wherein both the front end cover and the rear end cover are made of conductive metal material.

6. The motor of claim 1, wherein the conducting strip is made of conductive material.

7. The motor of claim 6, wherein the conducting strip is a copper sheet or conductive lead wire.

* * * * *